Dec. 21, 1943.  E. DAVIS  2,337,455
TWO-HANDLE CONTROL FOR POWER ACTUATED MACHINES
Filed Dec. 30, 1941  4 Sheets-Sheet 1
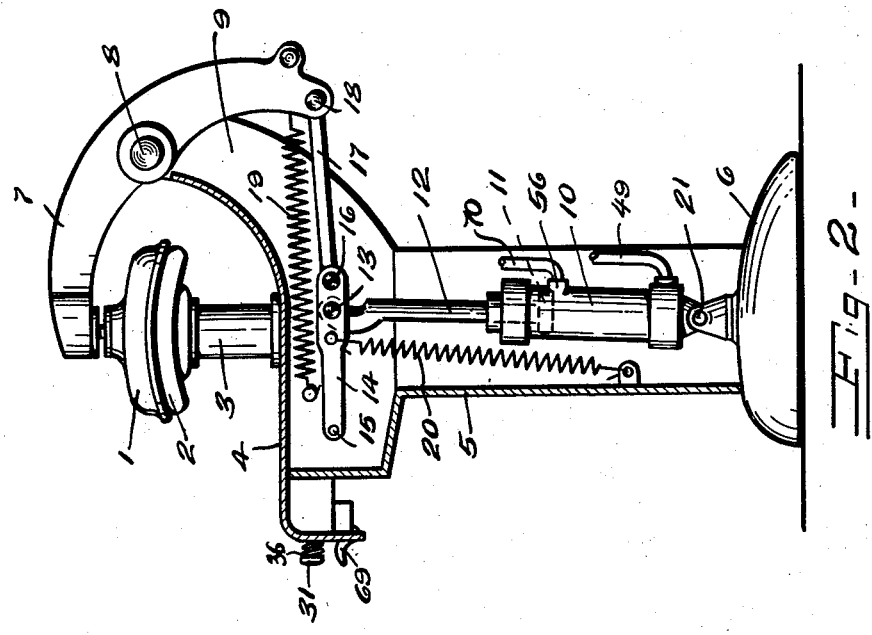
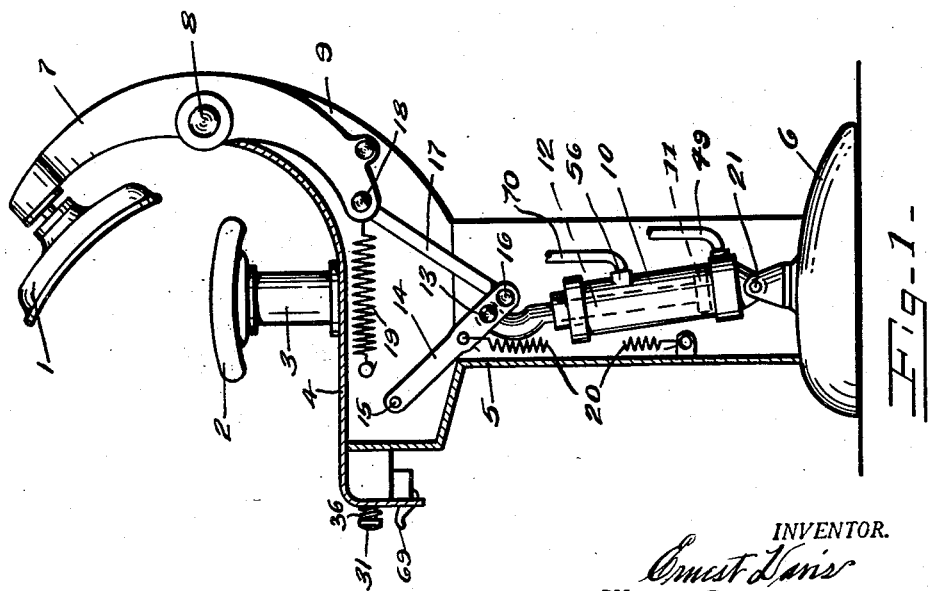
INVENTOR.
Ernest Davis
BY Bodell & Thompson
ATTORNEYS.

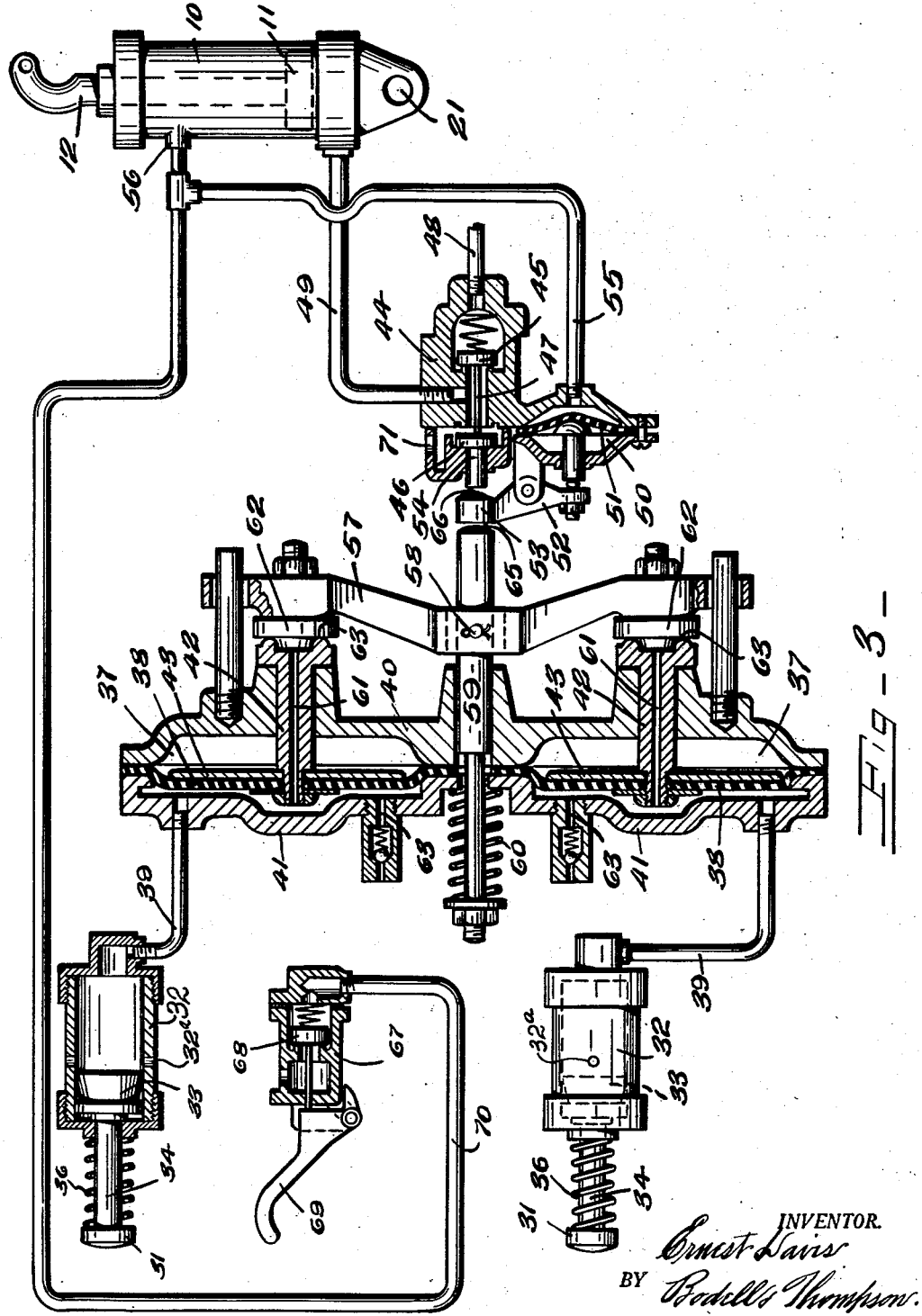

Dec. 21, 1943. E. DAVIS 2,337,455
TWO-HANDLE CONTROL FOR POWER ACTUATED MACHINES
Filed Dec. 30, 1941 4 Sheets-Sheet 3
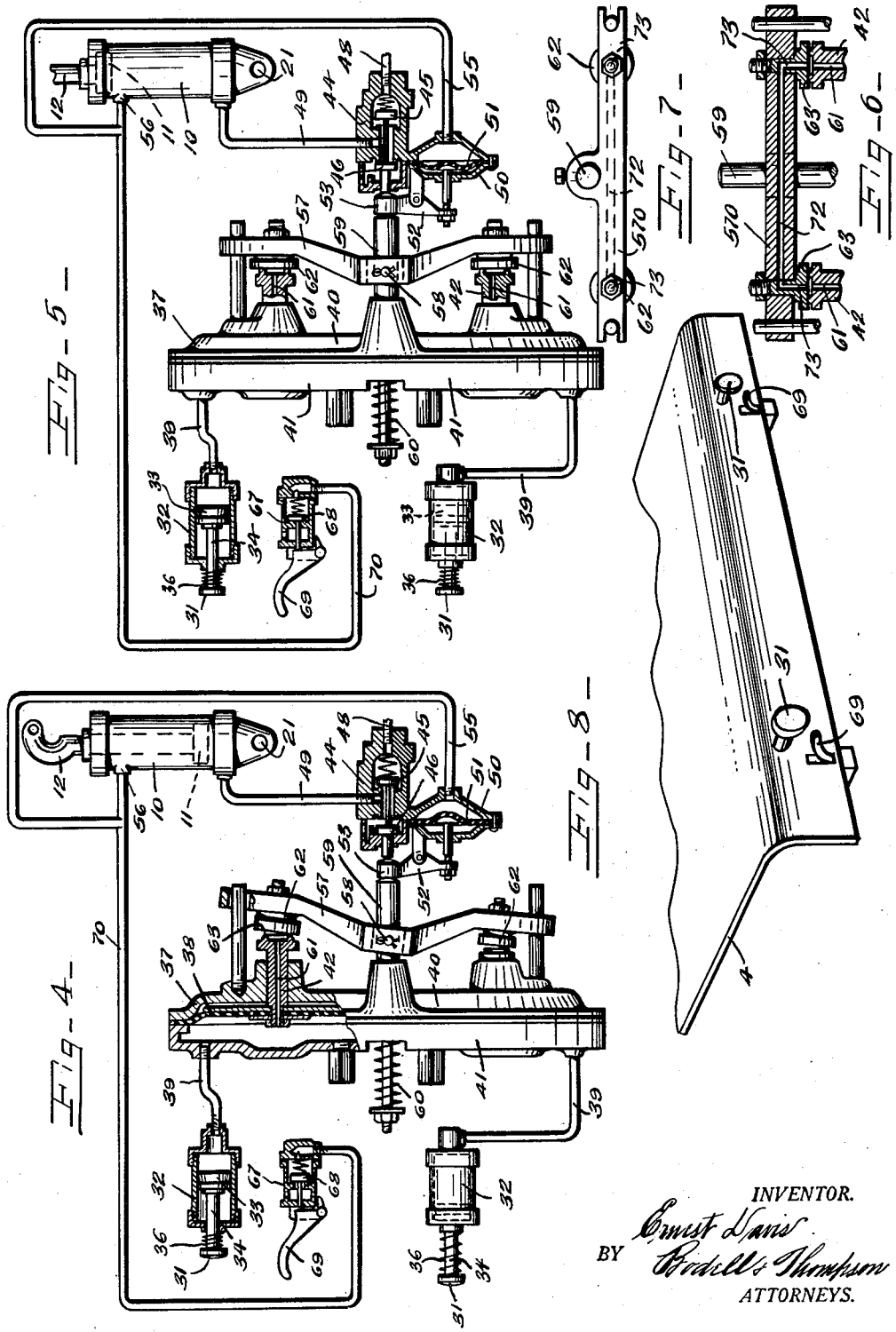
INVENTOR.
Ernest Davis
BY Wardell & Thompson
ATTORNEYS.

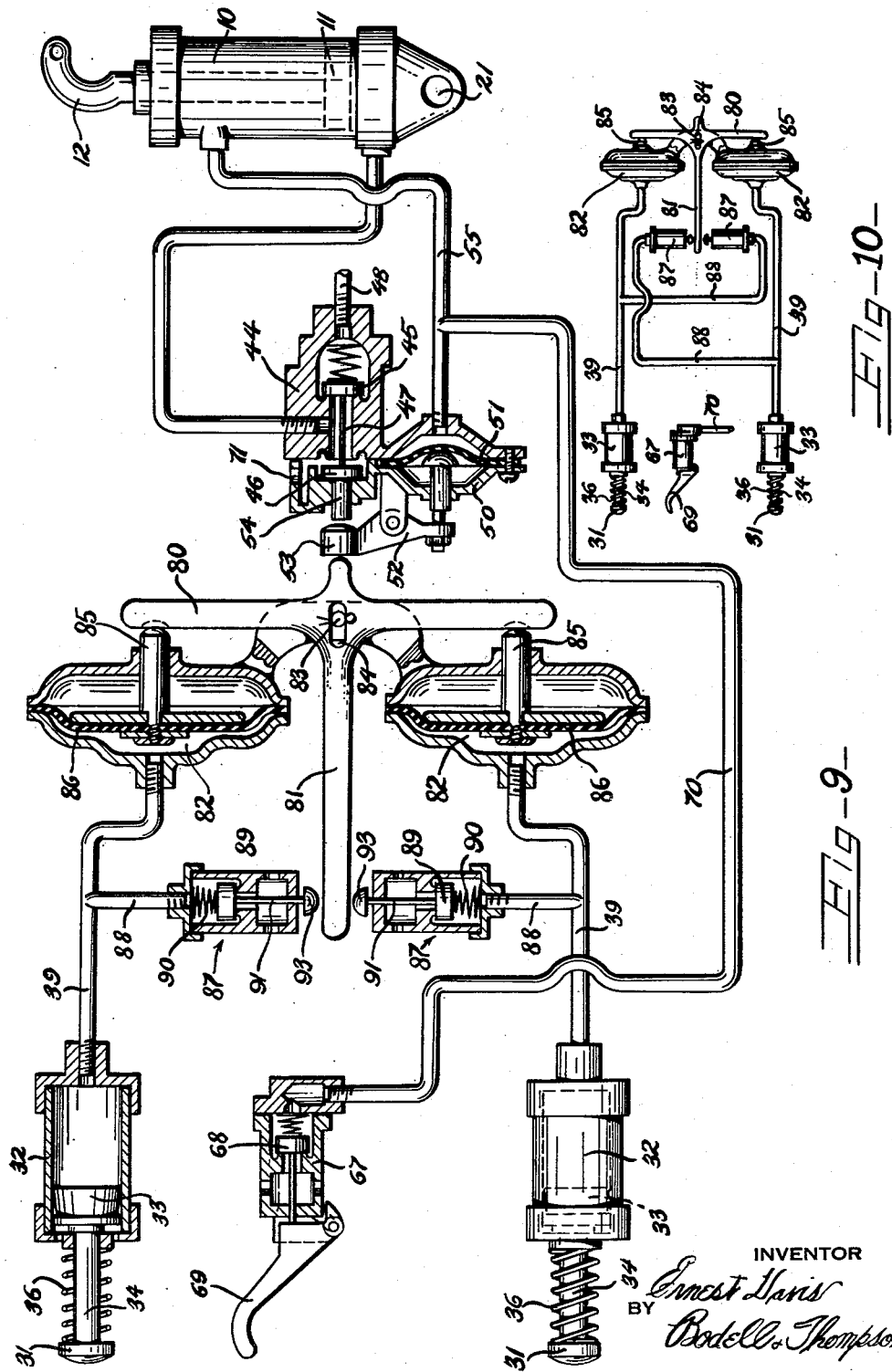

Patented Dec. 21, 1943

2,337,455

UNITED STATES PATENT OFFICE 2,337,455

TWO-HAND CONTROL FOR POWER-ACTUATED MACHINES

Ernest Davis, Syracuse, N. Y., assignor to The Prosperity Company, Inc., Syracuse, N. Y., a corporation of New York Application December 30, 1941, Serial No. 424,965

17 Claims. (Cl. 121—38)

This invention relates to a two hand control mechanism for power actuated machines, and has for its object a new and novel two hand control mechanism, which requires the simultaneous operation or operation in unison of two manuals, and which is inoperable upon the operation of only one manual or the tying down of one manual in operated position, or upon the alternate operation of the manuals.

It further has for its object a two hand control mechanism comprising a master control element, in this embodiment of the invention, a valve, a pair of manuals, a pair of motors, as in the illustrated embodiment, diaphragm chambers controlled by the manuals and including movable members, stems or plungers on the diaphragms in the diaphragm chambers, means operated by the movable members or stems when the motors are operated simultaneously, to control the operation of the master control, and by the operation of either one only of the manuals and its companion motor for preventing the effective operation of the other motor or the effective operation of the other manual; and more specifically, means operable by the operation of either one only of the motors to disable that motor when only one manual is operated, so that simultaneous operation of both manuals and motors is required to prevent disabling of the motors when both manuals are operated simultaneously.

It further has for its object, and more specifically, normally-closed, valve-controlled, outlet passages for the pressure operated motors or diaphragm chambers, which are controlled by the manuals respectively, with means operated upon the operation of either motor only by its manual for opening the outlet of that motor, and thus immediately disabling the motor, but which means is inoperative when both manuals are operated simultaneously.

It further has for its object such a two hand control mechanism including a motion transmitting means or a motion transmitting part having a limited, as a differential, movement, upon operation of only one manual insufficient to effect the operation of a control element of the power actuated machine, and a full operating movement upon actuation of both manuals simultaneously, sufficient to operate the control element of the machine, together with disabling means effected by the limited or differential action to immediately disable the mechanism operated by one manual when only one manual is operated.

It further has for its object a two hand control mechanism which is particularly simple and economical in construction and readily applied to power machines.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figures 1 and 2 are side elevations, partly in section, of one type of power operated machine, as a garment and laundry press, having an opening and closing movement provided with this two hand control.

Figure 3 is an enlarged, partly diagrammatic, view of the two hand control and a control element and cooperating parts of the power operated machine.

Figures 4 and 5 are views similar to Figure 3 showing the operation of the disabling means when only one manual is operated and the operation thereof when both manuals are operated.

Figure 6 is a fragmentary view illustrating a modified form of the disabling means shown in Figure 3.

Figure 7 is a fragmentary plan view of parts seen in Figure 6.

Figure 8 is a fragmentary perspective view of the front end of the table of the power actuated machine or press showing the location of the manuals thereon.

Figure 9 is a view similar to Figure 5 of another exemplification of the invention.

Figure 10 is a diagrammatic view of a fourth exemplification of the invention.

The illustrated two hand control mechanism comprises, generally, a pair of motors controlled respectively by the manuals and including movable members, motion transmitting means between the movable members and the master control element for the power mechanism of the machine and comprising a part common to both the movable members, operating means which, when one manual only is operated, disables the motor controlled by the one manual which is operated, whereby the simultaneous operation of both manuals is required to operate the master control element.

In the illustrated embodiment of the invention, pneumatic compressors are operated by the manuals, as cylinders, and pistons or plungers operated by the manuals, one piston and cylinder fo reach manual, and a pair of pneumatic motors as pressure operated motors, connected in series with the former compressors respectively or the cylinders thereof, and including movable members, the combined movement of which is required to effect the operation of the master control. The means operable to effect the disabling of either of the motors when its companion manual only is operated, operates to permit the exhaust of air from the one of the second pair of motors, which is operated alone, and the other of the second pair of motors is not operated, and to prevent the exhaust of air when both manuals are operated, and hence both of the second motors are energized simultaneously.

Although the two hand control mechanism may be applied to any power operated machine, it is here illustrated as applied to a garment and laundry press ehaving an opening and closing movement, and a machine in which the power mechanism includes a cylinder and piston and the control element therefor is a valve.

The machine here illustrated comprises an upper pressing element or head 1 movable toward and from a lower pressing element or buck 2, the latter being mounted on a suitable bracket or bolster 3 rising from the table 4 of the machine. The table 4 is mounted on a suitable frame or pedestal 5 rising from a base 6. The press head 1 is here shown as carried by a yoke lever 7 pivoted between its ends at 8 to a forwardly extending arm or bracket 9 on the frame.

The actuating mechanism, as here shown, comprises a motor consisting of a cylinder 10 having a piston 11 therein, the rod 12 of which is pivoted at 13 to a link 14, the link being pivoted at one end at 15 to the frame beneath the table and being pivoted at its other end at 16 to one end of the link 17 which is pivoted at its other end at 18 to the end of the yoke lever 7. The links 14 and 7 have a toggle action and move into a horizontal line when moved toward straightened position to close the head 1 down on the buck 2. The closing movement of the head is against the action of a returning spring 19 and the toggle consisting of the links 14 and 17 is also acted upon by a returning spring 20. The cylinder is pivoted at its lower end at 21 to have an oscillating movement during the reciprocation of the piston therein.

The construction of the press and its actuating mechanism forms no part of this invention.

The manuals of the two hand control are here shown as a pair of push buttons 31 and the compressors operable individually thereby, as cylinders 32 and plungers or pistons 33 therein. The pistons are actuated in one direction by the push buttons and are carried by the stems 34 of the push buttons. The pistons 33 and stems 34 are acted upon by returning spring 36. The pair of pressure operated motors are here shown as diaphragm chambers 37, each having a diaphragm 38 therein, the diaphragm chambers being connected in series respectively with the cylinders 32, as by conduits 39. The diaphragm chambers are formed in a single unit or body 40 having a removable cover 41, the diaphragms being mounted between the cover and the body. Each of the movable members in the diaphragm chambers also include a stem 42 extending to the outside of the body, the stems usually having a discoidal head 43 pressing against the diaphragm 38.

As the two hand control mechanism is shown as applied to a power machine, wherein the power unit is a cylinder and piston, the control element is a valve. 44 designates the control valve, this being a combined intake and exhaust valve including a casing, a normally closed intake valve head 45 and a normally open exhaust valve head 46 connected together by a stem 47, so that they act as a unit. The valve casing is connected by a pipe 48 to a suitable source of compressed air and is also connected to the cylinder 10 by a pipe 49. After being operated, that is, after the intake valve head 45 is opened and the exhaust valve head 46 closed, the control valve is locked in this position by means timed by the closing movement of the press. This means, as here shown, consists of a diaphragm chamber 50 having a diaphragm 51 therein, which operates a lever 52 having a head 53 thrusting against the stem 54 of the combined intake and exhaust valve. The pressure side of the diaphragm chamber 50 is connected by a pipe 55 to the cylinder through a port 56 arranged to be uncovered by the piston 11 when the piston has traveled a predetermined distance on its power stroke, so that when the piston uncovers the port 56, air enters the diaphragm chamber 50, actuates the diaphragm 51 therein, and holds the lever 52 in the position into which it has been operated by the two hand control, as will be presently described. Any other form of control and control holding means may be substituted for this valve control.

The motion transmitting means between the movable members operated by the combined action of the diaphragm 38 and the control valve or the lever 52 thereof comprises a member 57 having differential movement insufficient to open the master control valve upon operation of either manual alone, and its companion diaphragm 38, and a rectilinear movement sufficient to open the control valve, upon the operation of both manuals simultaneously, and hence the actuation of both diaphragms simultaneously, causing the stems 42 to actuate the member 57 rectilinearly. The member 57 is here shown as a differential or equalizing lever pivoted at 58 between its ends to a rectilinearly movable carrier, as a sliding rod 59 slidably mounted in the body 40 and arranged so that one end of the rod thrusts against the lever 52 of the control valve. The movement of the rod or carrier 59 is against the action of a suitable returning spring 60. The motors 37 are provided with disabling means, as outlet passages for exhausting or dissipating the pressure from the pressure side of one diaphragm chamber 37, when only one manual, creating pressure in that diaphragm chamber, is operated. As here shown, the outlet passages are formed in the stems 42.

61 designates the outlet passages extending lengthwise of the stems 42 and opening at their inner ends into the diaphragm chambers 37 on the pressure sides of the diaphragms, and at their other ends through the outer ends of the stems 42. The outlet passages 61 are normally closed by valves operated by the motion transmitting means, these valves 62 being shown as carried at opposite ends of the lever 57 and normally coacting with valve seats 63 at the outer ends of the stems 42. Upon the operation of only one manual, the movable member 38 of the corresponding motor is momentarily operated, causing the differential lever 57 to tilt about the valve seat of the other motor, that is, the valve seat at the outer end of the stem 42 of the other motor. This tilting action causes each valve 62 to be tilted partly off its seat, permitting the air to exhaust from the pressure side of the diaphragm chamber 37, the diaphragm of which has been operated by the one push button and also opens the valve 62 for the other diaphragm chamber. The exhaust of the air immediately disables the operated motor 37 and disables the other air connection or diaphragm motor. Upon the operation of both manuals simultaneously, both diaphragms 37 are operated without tilting the lever 57, and hence both outlet passages 61 remain closed and the lever 57 is moved rectilinearly to operate the lever 52 of the control valve, and hence open the intake valve head 45 and close the exhaust valve head 46 of the control valve. The operation of the control valve permits air to pass through the pipe 49 from the pipe 48 to the cylinder 10 of the actuating mechanism of the machine and actuate the piston therein. In the event the operator releases either or both manuals 51 before the machine has been operated a predetermined distance, or before the head 1 comes close to the buck 2, or in this embodiment of the invention, before the piston 11 passes the port 56, then the push buttons 31 and pistons 33 operated thereby will be returned by returning springs 36 to their normal position, drawing back the air out of the diaphragm chambers 37 or removing the pressure upon the diaphragm, so that the spring 60 reacts to move the motion transmitting lever and permits the spring acting on the control valve head 45 to re-act and close the intake valve head 45 and open the exhaust valve head 46, and hence permit air to exhaust from the cylinder 10 through the pipe 55 to the diaphragm chamber 50 to lock the lever 52 and the control valve 44 in operated position.

During the operation of the manuals, the air in the cylinder 32 and pipes 39 merely works back and forth. However, when the air is released through an outlet passage 42 by the operation of one manual only, additional air is taken into the diaphragm chambers 37 on the pressure sides thereof when the manual is released, through a check valve controlled port 63 one for each diaphragm chamber 37. A space or lost motion is provided between the end of the sliding rod 59 and the lever 52 at 65 and also between the lever 52 and the stem 54 at 66. This lost motion is merely for the purpose of avoiding the translation of any motion at all from the rod 59 to the lever 52 during differential movement of the lever, and hence to the master control valve when only one manual is operated.

The outlet passages 61 and the valves 62 operated by the limited or differential motion transmitting means, as the lever 57, constitutes disabling means for the diaphragm motors 37 when only one manual 31 is operated, which disabling means specifically consists of normally closed valves, one for each pressure operated motor or diaphragm chamber 37, either or both of which valves are opened when the corresponding manual or either manual only is operated, and both of which remain closed, when both manuals are operated simultaneously. In other words, either valves or both are opened by the differential angular movement of the lever 57 resulting from the operation of only one manual 31.

In a machine which remains closed, after being closed, manually operable release means is provided for opening the machine or press when desired. As the machine here illustrated is a garment or laundry press, which remains closed, means is provided for exhausting the air from the cylinder 10 and from the diaphragm chamber 50 which operates to hold the control valve in its operated position. Since the cylinder and diaphragm chambers are interconnected, exhausting the air from either the cylinder or the diaphragm chamber will open the press. The release means is here shown as including a valve casing 67 having a normally-closed, spring-pressed exhaust valve 68 therein, and a release or finger lever 69 operable to open the exhaust valve. The valve casing is connected by a pipe 70 to the cylinder, it being here shown as connected to the cylinder at the port 56. Thus, when the release lever is operated to open the exhaust valve, the air is exhausted from the diaphragm chamber 50, so that the intake valve head 45 of the master control closes under the re-action of its spring and the exhaust valve head 46 opens, permitting air to exhaust from the cylinder through the pipe 49, valve casing 44 out through the exhaust port 71. There are usually two release valves conveniently located, but the operation of only one is required to open the press.

As seen in Figure 6, instead of a differential lever having a pivotal movement, the valve 62 may be carried by a motion transmitting member 570 corresponding to the differential lever 57, this being rigid with the carrier 59 instead of pivoted thereto and formed with a passage 72 extending lengthwise thereof and which has angular portions 73 at its ends opening through the faces of the valve heads 62. Thus, upon the operation of only one manual, one motor 37 only is actuated, the valve head 62 coacting with the other motor 37, that is, the motor 37 that is not energized or operated, will be lifted from its seat, so that the air can exhaust from the motor that is energized or operated through the passage 72 and passages 73. In order to prevent building up of the pressure in the motor or diaphragm chamber controlled by the manual, that is not operated, in the event the air pressure in the diaphragm chamber connected to the manual that is operated is not sufficient to partly lift the member 570, each cylinder 32 of the manuals may be provided with a leak-out port 32ᵃ located just in front of the plunger 33, when the plunger is in its retracted or starting position, so that the port will be immediately passed by the plunger, upon the initial movement of the plunger by the push button 31, and if one button only is operated, the air will exhaust out through the cylinder associated with the other push button. The type of manual forms no part of the invention, and these manuals may be of the combined intake and exhaust type, where the exhaust is open when the manuals or push buttons are in idle or starting position.

In the illustrated embodiment of the invention, the master control valve is shown as operated directly by the pressure operated motors or diaphragms in the diaphragm chambers, but the opening of the master control instead of being operated directly by the movement of the diaphragms 43 through the lever 57 or 570 may be merely controlled by the operation of these motors 41.

In the general operation, the depression of both manuals 31 simultaneously, causes the diaphragms 38 to be actuated and actuate the plungers or stems 42 which in turn actuate the carrier 59 through the member or part 47 to open the master control valve to permit air to pass to the cylinder 10 and actuate the piston 11 therein on its power stroke. This effects the closing of the press. To open the press, the release lever 69 is operated to open the valve head 68. Upon depression of only one manual 31, the air enters the corresponding diaphragm chamber 37 behind the diaphragm 38 therein, actuating the corresponding stem or plunger 42. This causes a limited movement of the member 57 (Figure 3) sufficient to tilt the lever 57 and thus open the valve head 62, permitting air to exhaust from the pressure side of the diaphragm chamber, thus disabling the motor to which the air has been supplied by depression of only one of the manuals 13.

In the form shown in Figure 6, the actuation of only one manual causes the member 570 to move rectilinearly moving the valve head 62 controlling the motor, that is not energized, off its seat so that the air exhausts from the motor that is energized through the passage 72 in the member 570, thus disabling the motor which has been energized. It being understood that the manuals operate combined intake and exhaust valves or the cylinders 32 may have the leak-out ports previously referred to.

In the form shown in Figures 9 and 10, the differential member or lever 80, corresponding to the member 57, is shown as having not only a pivotal movement but a rectilinear movement and also as provided with a radial arm 81 at a right angle to the arm of the lever and movable laterally relative to its operating movement in one direction or the other during pivotal movement of the lever 80, to open one or the other of the diaphragm chambers 82 to the exhaust of air, when only one manual 31 is operated, and to move rectilinearly with the lever 80 without lateral movement, when both manuals 31 are operated in unison, hence, not opening the diaphragm chambers to the exhaust of air forced thereinto by the operation of both manuals 31. The rectilinear movement operates the master valve 44, as in Figures 4 and 5. The lever 81 is pivoted at 83 and its pivot extends through a lengthwise slot 84 in the lever. The end of the lever 80 cooperates with the stems 85, which are operated by the diaphragms 86 in the diaphragm chambers 82. These stems are not provided with exhaust passages but merely act as plungers thrusting against opposite ends of the lever 80. The third arm 81 of the lever 80 opens one or the other of normally-closed exhaust valves 87, the casings of the valves 87 being connected to the pipes 39 respectively leading from the cylinders 32 by pipes 88. The movable valve members 89 of the exhaust valves are pressed to closed position by springs 90, and each of these valves is provided with a stem 91 extending out of the valve casing. These stems have heads 93 arranged on opposite sides of the arm 81. Thus, if only one push button 31 is operated, the corresponding diaphragm chamber 82 only will be energized and the lever 81 tilted about the pivot 83. The tilting movement causes the arm 81 to open one of the exhaust valves 87 to permit the air to immediately exhaust from the diaphragm chamber that has been energized. When both manuals 31 are operated in unison, both plungers 85 thrust equally on the ends of the lever 80 and the lever 80 is moved rectilinearly to operate the valve 44 in the slot 84, permitting the rectilinear movement. During the rectilinear movement, the arm 81 does not swing in one direction or the other about the pivot 83, and hence both exhaust valves 87 remain closed.

In Figure 9, the exhaust valve operates to exhaust the diaphragm chamber that has been energized by the operation of its corresponding manual 31. In Figure 10, the swinging movement of the arm 81 operates to open the exhaust valve 87 connected to the pipe between the other manual and its diaphragm chamber, so that upon operation of one manual only, as the right hand manual (Figure 10), the right hand diaphragm chamber 82 will be energized, tilting the lever 80 and its arm 81 counterclockwise, the arm 81 moving to the right and opening the right hand exhaust valve, which is connected to the left hand pipe 39 between the cylinder operated by the left hand manual 31 and its corresponding left hand diaphragm chamber 82. Hence, upon operation of the left hand manual 31, the air from its companion cylinder 32 will not energize the left hand diaphragm chamber 82 but will exhaust out through the right hand exhaust valve 87. Hence, in either of the constructions shown in Figures 9 and 10, one diaphragm chamber is rendered ineffective by the operation of either one only of the manuals.

In any form of the invention, one of the motors, specifically a diaphragm chamber, is disabled upon the operation of one only of the manuals and both motors are energized only when both manuals are operated in unison.

Because of the disabling means, the operation of both manuals 31 simultaneously is required to prevent the exhaust of air from the diaphragm chambers.

What I claim is:

1. A two hand control mechanism for power actuated machines including a master control element, a pair of manuals, a pair of motors controlled respectively by the manuals and including movable members, motion transmitting means between the movable members and the master control element and common to both movable members and effectively operable only by the simultaneous operation of both motors, and means operable by the operation of either one only of the motors to disable one of the motors, whereby the simultaneous operation of both motors is required to prevent disabling of either one of the motors when both manuals are operated simultaneously.

2. A two hand control mechanism for power actuated machines including a master control element, a pair of manuals, a pair of motors controlled respectively by the manuals and including movable members, motion transmitting means between the movable members and the master control element and common to both movable members and effectively operable only by the simultaneous operation of both motors, and means operable by the operation of either one only of the motors to disable that motor, whereby the simultaneous operation of both motors is required to prevent disabling of the motors when both manuals are operated simultaneously.

3. A two hand control mechanism for power actuated machines including a master control element, a pair of manuals, a pair of motors controlled respectively by the manuals and including movable members, motion transmitting means between the movable members and the master control element and common to both movable members and effectively operable only by the simultaneous operation of both motors, and means operable by the operation of either one only of the motors to disable one of the motors, whereby the simultaneous operation of both motors is required to prevent disabling of the motors when both manuals are operated simultaneously.

4. A two hand control mechanism for power actuated machines including a master control element, a pair of manuals, a pair of motors controlled respectively by the manuals and including movable members, motion transmitting means between the movable members and the master control element and common to both movable members and effectively operable only by the simultaneous operation of both motors, and means operable by the operation of either one only of the motors to disable the other motor, whereby the simultaneous operation of both motors is required to prevent disabling of the motors when both manuals are operated simultaneously.

5. A two hand control mechanism for power actuated machines including a master control element, a pair of manuals, a pair of pressure operated motors controlled respectively by the manuals and including movable members, motion transmitting means between the movable members and the master control element effectively operable only by the simultaneous operation of both motors and including a portion common to both of the movable members, the motors having outlet passages from the pressure sides thereof, and normally closed valve means for controlling said passages and openable by the operation of said portion of the motion transmitting means by one of the motors only and remaining closed upon the simultaneous operation of both motors.

6. A two hand control mechanism for power actuated machines including a master control element, a pair of manuals, a pair of pressure operated motors controlled respectively by the manuals and including movable members, motion transmitting means between the movable members and the master control element effectively operable only by the simultaneous operation of both motors and including a portion common to both of the movable members, the motors having outlet passages from the pressure sides thereof, and normally closed valves for controlling said passages and openable by the operation of said portion of the motion transmitting means by one of the motors only and remaining closed upon the simultaneous operation of both motors, said valves including heads on said portion of the motion transmitting means and coacting with seats on the movable members, one being movable off the seat of one of the movable members upon operation of only one motor and both heads remaining seated upon the simultaneous operation of both motors.

7. A two hand control mechanism for power actuated machines including a master control element, a pair of manuals, a pair of pressure operated motors controlled respectively by the manuals and including movable members, motion transmitting means between the movable members and the master control element effectively operable only by the simultaneous operation of both motors and including a portion common to both of the movable members, the motors having outlet passages from the pressure sides thereof, and normally closed valves for controlling said passages and openable by the operation of said portion of the motion transmitting means by one of the motors only and remaining closed upon the simultaneous operation of both motors, said valves including heads on said portion of the motion transmitting means and coacting with seats on the movable members, one being movable off the seat of one of the movable members upon operation of only one motor and both heads remaining seated upon the simultaneous operation of both motors, said portion having a differential movement when either one only of the motors is operated upon the operation of only the corresponding manual and the differential movement operating to open one of said valve heads.

8. A two hand control mechanism for power actuated machines including a master control element, a pair of manuals, a pair of pressure operated motors controlled respectively by the manuals and including movable members, motion transmitting means between the movable members and the master control element effectively operable only by the simultaneous operation of both motors and including a portion common to both of the movable members, the motors having outlet passages from the pressure sides thereof, and normally closed valves for controlling said passages and openable by the operation of said portion of the motion transmitting means by one of the motors only and remaining closed upon the simultaneous operation of both motors, said valves including heads on said portion of the motion transmitting means and coacting with seats on the movable members, one being movable off the seat of one of the movable members upon operation of only one motor and both heads remaining seated upon the simultaneous operation of both motors, said portion having a passage therethrough and opening at its opposite ends through the valve heads respectively, whereby the passage is normally in communication with the outlet passage of the motors and upon operation of only one motor, the valve head coacting with the outlet passage of the other motor, is opened permitting the exhaust from the operated motor.

9. A two hand control mechanism for power actuated machines including a master control element, a pair of manuals, a pair of motors controlled respectively by the manuals and including movable members, motion transmitting means between the movable members and the master control element and common to both of the movable members, the motion transmitting means being effectively operable only by the simultaneous operation of both motors and including a part having a differential movement when either one only of the motors is operated upon the operation of only the corresponding manual, said differential movement being insufficient to effect the operation of the control element, and means operable by the differential movement of said part for disabling the motor controlled by the one manual, which is operated, whereby the simultaneous operation of both manuals is required to operate the master control element.

10. A two hand control mechanism for power actuated machines including a master control element, a pair of manuals, a pair of motors controlled respectively by the manuals and including movable members, motion transmitting means between the movable members and the master control element and common to both of the movable members, the motion transmitting means comprising a rectilinearly movable carrier, a part mounted on the carrier and having a differential movement relatively thereto and coacting with the movable members of the motors, said part having a differential movement when either one only of the movable members of the motor is operated upon the operation of only the corresponding manual, said differential movement being insufficient to effect the operation of the control element, and means operated by the differential movement of said part for disabling the motor controlled by the one manual which is operated, whereby the simultaneous operation of both manuals is required to operate the master control element.

11. A two hand control mechanism for power actuated machines including a master control element, a pair of manuals, a pair of motors controlled respectively by the manuals and including movable members, motion transmitting means between the movable members and the master control element and common to both of the movable members, the motion transmitting means comprising a rectilinearly movable carrier, a lever pivoted between its ends to the carrier and coacting on opposite sides of its pivot with the movable members of the motors respectively, the pivotal movement of the lever by either of said motors being insufficient to effect the operation of the control element, and means operated by the pivotal movement of said lever for disabling the motor controlled by the one manual which is operated, whereby the simultaneous operation of both manuals is required to operate the master control element.

12. A two hand control mechanism for power actuated machines including a master control element, a pair of manuals, a pair of motors controlled respectively by the manuals and including movable members, motion transmitting means between the movable members and the master control element and common to both of the movable members, the motion transmitting means comprising a part having a differential movement when either one only of the motors is operated upon the operation of only the corresponding manual, said differential movement being insufficient to effect the operation of the control element, means operable by the differential movement of said part for disabling the motor controlled by the one manual, which is operated, whereby the simultaneous operation of both manuals is required to operate the master control element, releasable means operated by the operating movement of the machine for locking the master control element in its operated position.

13. A two hand control mechanism for power actuated machines including a master control element, a pair of manuals, a pair of pressure operated motors including movable members, means operated by the manuals for effecting the flow of pressure fluid to the motors respectively, motion transmitting means common to the movable members of the motors and coacting with the master control element to operate the same, and means operable by the movement of a portion of the motion transmitting means for disabling either one of the motors when only the corresponding manual is operated, whereby the simultaneous operation of both manuals is required to operate the master control element.

14. A two hand control mechanism for power actuated machines including a master control element, a pair of manuals, a pair of pressure operated motors, each including a movable member, the motors having outlet passages from the pressure sides of the movable members thereof, means operated respectively by the manuals for controlling the flow of pressure fluid to the motors, motion transmitting means between the movable members of the motors and the master control element having a limited movement under the action of the movable member of either one of the motors insufficient to operate the master control element, and a full movement upon the operation of both manuals simultaneously sufficient to operate the master control element, normally closed valve means for said outlet passages operable to open position by the limited movement only of said motion transmitting means, and means tending to return the movable members of the motors and the motion transmitting means to starting position when the manuals are released.

15. A two hand control mechanism for power actuated machines including a master control element, a pair of manuals, a pair of motors, and means by which the motors are energized by the operation of the manuals respectively, motion transmitting means between the motors and the master control element including a member common to the motors operable out of normal position by the energization of either one only of the motors, and means operable by the movement of said member out of normal position to de-energize the energized motor.

16. A two hand control mechanism for power actuated machines including a master control element, a pair of manuals, a pair of motors, and means by which the motors are energized by the operation of the manuals respectively, motion transmitting means between the motors and the master control element including a member common to both motors and operable by the simultaneous operation of both motors to transmit motion, and means operable by the operation of either one only of the manuals for disabling one of the motors.

17. A two hand control mechanism for power actuated machines including a master control element, a pair of manuals, a pair of pressure operated motors, means operated by the manuals for effecting the control of motive fluid to the motors respectively, motion transmitting means operated by the motors to operate the master control element and including a member having a differential movement under the action of either one only of the motors and operating to operate the control element upon the simultaneous operation of both motors, and normally closed exhaust valves for each motor, one of which is operable by the differential movement of said member in one direction and the other by the differential movement of the said member in the opposite direction.

ERNEST DAVIS.